US012283400B2

(12) United States Patent
Elsaadani et al.

(10) Patent No.: US 12,283,400 B2

(45) Date of Patent: Apr. 22, 2025

(54) DIELECTRIC STRUCTURE, A METHOD OF MANUFACTURING THEREOF AND A FIRE RATED RADIO FREQUENCY CABLE HAVING THE DIELECTRIC STRUCTURE

(71) Applicant: RFS Technologies, Inc., Meriden, CT (US)

(72) Inventors: Asaad Elsaadani, Meriden, CT (US); Drausio Castro, Taboão Da Serra (BR); Joel Cacopardo, Hamden, CT (US); Thomas Kuklo, Denver, NC (US); Mihirraj Joshi, Middletown, CT (US)

(73) Assignee: RFS Technologies, Inc., Meriden, CT (US)

( * ) Notice: Subject to any disclaimer, the term of this patent is extended or adjusted under 35 U.S.C. 154(b) by 0 days.

(21) Appl. No.: 16/515,542

(22) Filed: Jul. 18, 2019

(65) Prior Publication Data

US 2021/0020327 A1 Jan. 21, 2021

(51) Int. Cl.

*H01B 3/12* (2006.01)
*H01B 7/02* (2006.01)
(Continued)

(52) U.S. Cl.

CPC ............. *H01B 3/12* (2013.01); *H01B 7/0275* (2013.01); *H01B 7/295* (2013.01); *H01B 11/1813* (2013.01); *H01B 11/1834* (2013.01)

(58) Field of Classification Search

CPC ........ H01B 3/12; H01B 7/0275; H01B 7/295; H01B 11/1813; H01B 11/1834; H01B 11/1847; H01B 11/1843; H01B 11/1865

See application file for complete search history.

(56) References Cited

U.S. PATENT DOCUMENTS

| | | | | |
|---|---|---|---|---|
| 2,576,163 A | | 11/1951 | Weston et al. | |
| 2,992,407 A | * | 7/1961 | Slusher | H01B 11/1865 333/244 |

(Continued)

FOREIGN PATENT DOCUMENTS

| | | |
|---|---|---|
| CA | 1308178 C | 9/1992 |
| CA | 2916515 A1 | 3/2017 |

(Continued)

OTHER PUBLICATIONS

Taha, "High Performance of the Coaxial Cable Based on Different Dielectrics", Journal Of Telecommunications, vol. 28, No. 2, Dec. 2014, pp. 1-6.

(Continued)

*Primary Examiner* — Timothy J Thompson
*Assistant Examiner* — Rhadames Alonzo Miller
(74) *Attorney, Agent, or Firm* — Wolf, Greenfield & Sacks, P.C.

(57) ABSTRACT

An article of manufacture comprising a first section having a first dielectric material and a second section having a second dielectric material and provided on an outer surface of the first section. The second dielectric material of the second section is more flexible than the first dielectric material of the first section, and the second section comprises elements of an organic material located partially on an outer surface of the second section. A coaxial cable using the article of manufacture and a method of manufacturing of the article are also disclosed.

12 Claims, 5 Drawing Sheets

(51) Int. Cl.
*H01B 7/295* (2006.01)
*H01B 11/18* (2006.01)

(56) References Cited

U.S. PATENT DOCUMENTS

| | | | | |
|---|---|---|---|---|
| 3,265,808 | A | 8/1966 | Binch | |
| 3,588,318 | A | 6/1971 | Ollis et al. | |
| 4,034,153 | A | 7/1977 | Andres et al. | |
| 4,280,225 | A | 7/1981 | Willis | |
| 4,549,041 | A | 10/1985 | Shingo et al. | |
| 4,700,159 | A * | 10/1987 | Jones, III | H01B 11/1865 174/28 |
| 4,780,695 | A | 10/1988 | Watari et al. | |
| 4,800,351 | A * | 1/1989 | Rampalli | H01Q 13/203 174/121 A |
| 4,806,416 | A | 2/1989 | Puzo | |
| 4,894,488 | A * | 1/1990 | Gupta | C08J 9/12 156/51 |
| 5,262,593 | A * | 11/1993 | Madry | H01B 11/1856 174/102 P |
| 5,422,614 | A * | 6/1995 | Rampalli | H01B 7/295 174/121 A |
| 5,742,002 | A * | 4/1998 | Arredondo | H01B 11/1847 174/102 D |
| 6,051,795 | A | 4/2000 | Fisher et al. | |
| 6,346,671 | B1 * | 2/2002 | Ahrens | H01B 11/1834 174/28 |
| 6,751,081 | B1 * | 6/2004 | Kooiman | H01P 1/266 361/119 |
| 7,525,041 | B2 * | 4/2009 | Howard | F02C 7/00 174/28 |
| 7,642,451 | B2 * | 1/2010 | Bonn | A61B 18/1815 174/28 |
| 9,748,022 | B2 * | 8/2017 | Gareis | H01B 7/0225 |
| 9,773,585 | B1 * | 9/2017 | Rogers | H01B 7/0275 |
| 9,799,429 | B2 * | 10/2017 | Adams | H01B 13/0009 |
| 9,922,751 | B2 * | 3/2018 | Zhang | H01B 11/20 |
| 10,606,005 | B1 | 3/2020 | Martin Regalado et al. | |
| 11,152,138 | B2 | 10/2021 | Elsaadani et al. | |
| 11,328,837 | B2 | 5/2022 | Elsaadani et al. | |
| 2002/0117325 | A1 * | 8/2002 | Mennone | H01B 7/295 174/121 A |
| 2003/0122636 | A1 * | 7/2003 | DiBenedetto | H01Q 13/203 333/237 |
| 2004/0074654 | A1 | 4/2004 | Springer et al. | |
| 2004/0118591 | A1 * | 6/2004 | Bufanda | H01B 11/1808 174/106 R |
| 2005/0183878 | A1 * | 8/2005 | Herbort | H01B 7/295 174/110 R |
| 2013/0093638 | A1 * | 4/2013 | Shoemaker | H01Q 13/203 343/770 |
| 2013/0098674 | A1 * | 4/2013 | Shoemaker | H01B 7/40 174/480 |
| 2013/0106615 | A1 * | 5/2013 | Prammer | H04L 25/24 340/854.6 |
| 2013/0133918 | A1 | 5/2013 | Konnik | |
| 2014/0008098 | A1 * | 1/2014 | Scaglione | H01B 7/28 174/107 |
| 2014/0037956 | A1 | 2/2014 | Sopory | |
| 2015/0060106 | A1 | 3/2015 | Polasky | |
| 2015/0179305 | A1 | 6/2015 | Gareis | |
| 2016/0236019 | A1 * | 8/2016 | Fyfe | B32B 7/08 |
| 2016/0248176 | A1 * | 8/2016 | Burris | H01P 1/266 |
| 2016/0329129 | A1 | 11/2016 | Osborne, Jr. et al. | |
| 2018/0083334 | A1 * | 3/2018 | Petrovic | H01P 5/085 |
| 2018/0174710 | A1 * | 6/2018 | Rogers | H01B 11/1813 |
| 2018/0286536 | A1 * | 10/2018 | Hazenfield | H01B 7/295 |
| 2018/0348460 | A1 | 12/2018 | Sahoo et al. | |
| 2019/0131034 | A1 | 5/2019 | Lee et al. | |
| 2020/0075196 | A1 * | 3/2020 | Eitel | H01B 7/292 |
| 2020/0211739 | A1 | 7/2020 | Elsaadani et al. | |
| 2021/0233682 | A1 | 7/2021 | Elsaadani et al. | |

FOREIGN PATENT DOCUMENTS

| | | | |
|---|---|---|---|
| CN | 200986608 | Y | 12/2007 |
| CN | 201522890 | U | 7/2010 |
| CN | 202473341 | U | 10/2012 |
| CN | 202633485 | U | 12/2012 |
| CN | 203721326 | U | 7/2014 |
| CN | 203931596 | U | 11/2014 |
| CN | 104616823 | A | 5/2015 |
| CN | 204480804 | U | 7/2015 |
| CN | 204537740 | U | 8/2015 |
| CN | 204787819 | U | 11/2015 |
| CN | 205122263 | U | 3/2016 |
| CN | 105825915 | A | 8/2016 |
| CN | 105958168 | A | 9/2016 |
| CN | 105989914 | A | 10/2016 |
| CN | 106373650 | A | 2/2017 |
| CN | 206471151 | U | 9/2017 |
| CN | 207337955 | U | 5/2018 |
| CN | 110570981 | A | 12/2019 |
| EP | 0106708 | A1 | 4/1984 |
| EP | 0150879 | A2 | 8/1985 |
| FR | 1070561 | A | 7/1954 |
| GB | 2035666 | A | 6/1980 |
| JP | S53-063685 | U | 5/1978 |
| JP | S59-132510 | A | 7/1984 |
| JP | H01109607 | A | 4/1989 |
| JP | H06-020534 | A | 1/1994 |
| JP | H07-027021 | U | 5/1995 |
| JP | 2005-302620 | A | 10/2005 |
| JP | 2007-326733 | A | 12/2007 |
| KR | 10-2009-0104367 | A | 10/2009 |
| WO | 99/48112 | A1 | 9/1999 |
| WO | 2019/047929 | A1 | 3/2019 |
| WO | 2019/236336 | A1 | 12/2019 |

OTHER PUBLICATIONS

Extended European Search Report received for corresponding European Patent Application No. 20185733.1, dated Nov. 26, 2020, 9 pages.

Office action received for corresponding Chinese Patent Application No. 202010696488.1, dated Jun. 3, 2021, 6 pages of office action and 1 page of Translation available.

Office action received for corresponding European Patent Application No. 20185733.1, dated Sep. 22, 2021, 9 pages.

“VITALink® MC 2-Hour Fire Rated Power Cable”, RSCC Wire & Cable LLC, Feb. 20, 2014, 2 pages.

“Radix Wire Co | CIS14A0102”, Anixter, Retrieved on Feb. 21, 2021, Webpage available at : https://www.anixtercom/en_us/products/CIS14A0102/RADIX-WIRE-CO/Multi-Pair-Multi-Conductor-Cable/p/%207A-1402C-1-1S-2HR%20%3E.

“AVA7RK-50—1-5/8" Fire Retardant Heliax Coax Cable”, RF Parts, Retrieved on Feb. 21, 2021, Webpage available at : https://www.rfparts.com/coax/heliaxcoax/heliax158inch/ava7rk-50.html.

“Okotherm CIC Fire Resistant Cable MC-HL C-L-X”, Nassau National Cable, Retrieved on Feb. 21, 2021, Webpage available at : https://nassaunationalcable.com/okotherm-cic-fire-resistant-cable-mc-hl-c-l-x.html.

International Search Report and Written Opinion received for corresponding Patent Cooperation Treaty Application No. PCT/CN2018/104657, dated Nov. 28, 2018, 9 pages.

“System 1850”, nVent Thermal Management, Retrieved on Feb. 21, 2021, Webpage available at : https://www.nventthermal.co.in/products/fired-rated-wiring-cables/wiring-cables/index.aspx?id=tcm:450-27812&catid=tcm:450-17758-1024.

Non-Final Office action received for corresponding U.S. Appl. No. 16/751,355, dated Jun. 12, 2020, 18 pages.

Non-Final Office action received for corresponding U.S. Appl. No. 16/644,232, dated Sep. 4, 2020, 11 pages.

Office action received for corresponding Chinese Patent Application No. 201880058189.6, dated Nov. 10, 2020, 5 pages of office action and 5 pages of translation available.

Office action received for corresponding Indian Patent Application No. 202047014890, dated Nov. 19, 2020, 6 pages.

(56) References Cited

OTHER PUBLICATIONS

Final Office action received for corresponding U.S. Appl. No. 16/751,355, dated Dec. 8, 2020, 20 pages.
Final Office action received for corresponding U.S. Appl. No. 16/644,232, dated Feb. 25, 2021, 16 pages.
Office action received for corresponding Japanese Patent Application No. 2020-513749, dated Apr. 6, 2021, 4 pages of office action and 6 pages of translation available.
Extended European Search Report received for corresponding European Patent Application No. 18854197.3, dated Apr. 12, 2021, 8 pages.
Extended European Search Report received for corresponding European Patent Application No. 21152681.9, dated Jun. 14, 2021, 7 pages.
Notice of Allowance received for corresponding U.S. Appl. No. 16/644,232, dated Jun. 25, 2021, 10 pages.
Non-Final Office action received for corresponding U.S. Appl. No. 16/751,355, dated Jul. 27, 2021, 19 pages.
Office action received for corresponding Chinese Patent Application No. 201880058189.6, dated Aug. 4, 2021, 4 pages of office action and 4 pages of translation available.
Office action received for corresponding Korean Patent Application No. 2020-7009711, dated Sep. 14, 2021, 6 pages of office action and 4 pages of translation available.
Office action received for corresponding Japanese Patent Application No. 2020-513749, dated Sep. 16, 2021, 4 pages of office action and 8 pages of translation available.
Office action received for corresponding Chinese Patent Application No. 202010696488.1, dated Jan. 5, 2022, 7 pages of office action and 2 pages of Summary available.
Office action received for corresponding European Patent Application No. 18854197.3, dated Jan. 27, 2022, 6 pages.
FHIT.1250—Electrical Circuit Integrity Systems', UL Product iQ, Sep. 14, 2020, pp. 1-4.
"Follow-Up Services", UL, Retrieved on Feb. 21, 2021, Webpage available at : https://www.ul.com/resources/follow-up-services.
Decision of Rejection received for corresponding Chinese Patent Application No. 201880058189.6, dated Feb. 22, 2022, 5 pages of Decision of Rejection and 3 pages of translation available.
Notice of Allowance received for corresponding U.S. Appl. No. 16/751,355, dated Mar. 3, 2022, 12 pages.
Office action received for corresponding Canadian Patent Application No. 3074522, dated Apr. 5, 2022, 5 pages.
Office action received for corresponding Australian Patent Application No. 2018328574, dated Apr. 22, 2022, 4 pages.
Final Office action received for corresponding Korean Patent Application No. 2020-7009711, dated May 9, 2022, 4 pages of Final office action and 4 pages of translation available.
Decision of Rejection received for corresponding Chinese Patent Application No. 202010696488.1, dated Jun. 6, 2022, 6 pages of office action and 2 pages of Summary available.
Office action received for corresponding Chinese Patent Application No. 202110086966.1, dated Jun. 14, 2022, 9 pages of office action and no page of Translation available.
Office action received for corresponding European Patent Application No. 18854197.3, dated Aug. 17, 2022, 5 pages.
Office action received for corresponding Japanese Patent Application No. 2020-513749, dated Sep. 1, 2022, 5 pages of office action and 6 pages of translation available.
Office action received for corresponding European Patent Application No. 20185733.1, dated Dec. 9, 2022, 12 pages.

* cited by examiner

DIELECTRIC STRUCTURE, A METHOD OF MANUFACTURING THEREOF AND A FIRE RATED RADIO FREQUENCY CABLE HAVING THE DIELECTRIC STRUCTURE

TECHNICAL FIELD

The present disclosure is directed, in general, to fire rated cables.

BACKGROUND

This section introduces aspects that may help facilitate a better understanding of the present disclosure. Accordingly, the statements of this section are to be read in this light and are not to be understood as admissions about what is in the prior art or what is not in the prior art.

A coaxial cable is typically made up of at least two conductors in such a way that the longitudinal axes of the two conductors are substantially parallel to each other, hence the term coaxial. Typically, a center (or inner) conductor is encapsulated by a dielectric helically wound around the conductor as insulating material (hereinafter referred to simply as "dielectric"). The dielectric is typically overlaid with an outer conductor, which is often annularly or helically corrugated. The dielectric is typically used to maintain a spacing (or gap) between the inner conductor and the outer conductor, where this spacing is typically necessary to obtain a prescribed characteristic impedance for the coaxial cable. The gap is often referred to as an "air gap", as some air is typically present and acts as a spacer between the inner and outer conductors, notwithstanding the presence of the dielectric which itself also acts as a spacer. The entire assembly can be encased within an outer protective jacket.

SUMMARY

Some embodiments feature an article of manufacture comprising:

a first section comprising a first dielectric material;

a second section comprising a second dielectric material and provided on an outer surface of the first section;

wherein the second dielectric material of the second section is more flexible than the first dielectric material of the first section; and wherein the second section comprises elements of an organic material located partially on an outer surface of the second section.

According to some specific embodiments, the first dielectric material of the first section is brittle and the second dielectric of the second section is flexible.

According to some specific embodiments, the first dielectric material is one of ceramic or silica.

According to some specific embodiments, the second dielectric is silica.

Some embodiments feature a radio frequency coaxial cable, comprising:

- a first conductor;
- a second conductor provided around the first conductor having a separation therewith;
- an insulating material provided within the separation between the first conductor and the second conductor; the insulating material including:
- a first section comprising a first dielectric material;
- a second section comprising a second dielectric material and provided on an outer surface of the first section;

wherein the second dielectric of the second section is more flexible than the dielectric of the first section; and wherein the second section comprises elements of an organic material located partially on an outer surface of the second section.

According to some specific embodiments of the coaxial cable, the insulating material is disposed helically around the first conductor.

According to some specific embodiments of the coaxial cable, the first dielectric material of the first section is brittle and the second dielectric of the second section is flexible.

According to some specific embodiments of the coaxial cable, the first dielectric material is one of ceramic or silica.

According to some specific embodiments of the coaxial cable, the second dielectric material is silica.

Some embodiments feature a method, comprising:

- subjecting a first dielectric material, having a first dielectric bulk section and a first outer organic layer surrounding the first bulk section, to a first heat cleaning process at a first temperature between 500° C. and 700° C., to thereby convert the first organic layer into a gas such that the first organic material is entirely removed from an outer surface of the first dielectric bulk section;
- applying a second dielectric material over the first dielectric bulk section the second dielectric material having a second dielectric bulk section and a second outer organic layer surrounding the second bulk section;
- subjecting a second dielectric material, to a second heat cleaning process at a second temperature between 200° C. and 300° C., to thereby caused the second outer organic layer to partially burn and be removed from an outer surface of the second dielectric bulk section; wherein the second dielectric material of the second section is more flexible than the first dielectric material of the first section.

In some embodiments of the method, the first temperature is 500° C.

In some embodiments of the method, the second temperature is 200° C.

In some embodiments of the method, the first dielectric material of the first section becomes brittle and the second dielectric of the second section is flexible.

In some embodiments of the method, the first dielectric material is one of ceramic or silica.

In some embodiments of the method, the second dielectric material is silica.

In some embodiments of the method, each of the first heat cleaning process and the second heat cleaning process is performed in the presence of oxygen.

Some embodiments feature a method of manufacturing a coaxial cable, comprising:

- providing a first conductor;
- providing a second conductor provided around the first conductor having a separation with the first conductor;
- providing an insulating material by:
  - subjecting a first dielectric material, having a first dielectric bulk section and a first outer organic layer surrounding the first bulk section, to a first heat cleaning process at a first temperature between 500° C. and 700° C., to thereby convert the first organic layer into a gas such that the first organic material is entirely removed from an outer surface of the first dielectric bulk section;
  - applying a second dielectric material over the first dielectric bulk section the second dielectric material having a second dielectric bulk section and a second outer organic layer surrounding the second bulk section;

subjecting a second dielectric material, to a second heat cleaning process at a second temperature between 200° C. and 300° C., to thereby caused the second outer organic layer to partially burn and be removed from an outer surface of the second dielectric bulk section;

wherein the second dielectric material of the second section is more flexible than the first dielectric material of the first section;

providing the insulating material within the separation between the first conductor and the second conductor.

BRIEF DESCRIPTION OF THE DRAWINGS

The embodiments of the disclosure are best understood from the following detailed description, when read with the accompanying drawings. Various features may not be drawn to scale and may be arbitrarily increased or reduced in size for clarity of discussion. Reference is now made to the following descriptions taken in conjunction with the accompanying drawings, in which.

DETAILED DESCRIPTION OF ILLUSTRATIVE EMBODIMENTS

Figure 1:
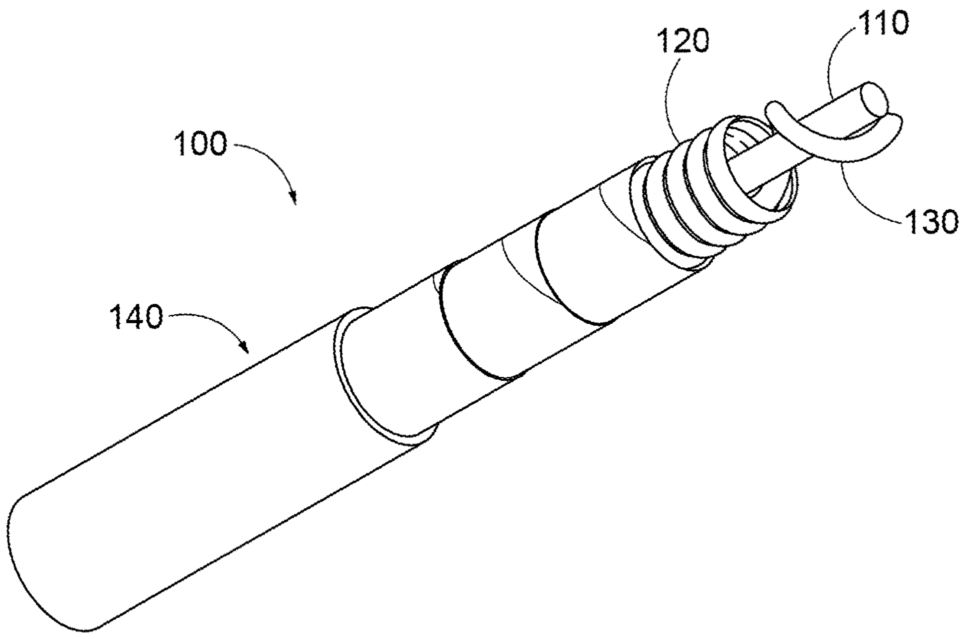
FIG. 1 is schematic representation of an example coaxial cable with certain parts thereof shown in some detail.

While this disclosure includes references to illustrative embodiments, this specification is not intended to be construed in a limiting sense. Various modifications of the described embodiments, as well as other embodiments within the scope of the disclosure, which are apparent to persons skilled in the art to which the disclosure pertains are deemed to lie within the principle and scope of the disclosure, e.g., as expressed in the following claims.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain the nature of this disclosure may be made by those skilled in the art without departing from the scope of the disclosure, e.g., as expressed in the following claims.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

The described embodiments are to be considered in all respects as only illustrative and not restrictive. In particular, the scope of the disclosure is indicated by the appended claims rather than by the description and figures herein. All changes that fall within the meaning and range of equivalency of the claims are to be embraced within their scope.

It should be appreciated by those of ordinary skill in the art that any block diagrams herein represent conceptual views of illustrative circuitry embodying the disclosed principles.

The following merely illustrates the principles of the disclosure. It will thus be appreciated that those skilled in the art will be able to devise various arrangements that, although not explicitly described or shown herein, embody the principles of the disclosure and are included within its spirit and scope. Furthermore, all examples and conditional language recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and embodiments of the disclosure, as well as specific examples thereof, are intended to encompass both structural and functional equivalents thereof.

Radio frequency (RF) coaxial cables are typically used for in-building communication and often for emergency communication systems as they are capable of transmitting RF signals. Given their use for emergency communications, such RF coaxial cables are, at least recently, required to pass one or a combination of safety measures as established, for example, by International Building Code (IBC), International Fire Code (IFC), Local Building Code, Local Fire Code, National Fire Protection Association (NFPA) 72, Chapter 24, NFPA 1221, and potentially NFPA 5000.

One of the most significant tests an RF coaxial cable needs to pass is a two-hour burn test under the Underwriters Laboratory code, UL 2196, at a very high temperature, e.g. 1010° C. (1850° F.), followed by a water hose blast and subsequent functionality test. However, these testing standards often turn out to be too harsh for being applied to a typical RF coaxial cable.

It has been proposed to place the RF coaxial cable in a Phenolic conduit to protect the cable from extreme heat. However, this arrangement is expensive and, to the knowledge of the inventors, has not been tested to pass the above-referenced burn tests. In particular, it seems unlikely that such solution would pass NFPA 72, Chapter 24, and NFPA 1221 or meet the NFPA 5000 requirements. One of the main reasons for this belief is that the temperature inside the conduit, in particular within buildings and tunnels may become too extreme (around 1850° F., 1010° C.) at which the plastic dielectric material of the coaxial cable may melt and char, causing the inner conductor to electrically short-circuit with the outer conductor, thereby causing a loss in the communication. This situation would be contrary to what one of the main purposes of the RF coaxial cables is, i.e. ensuring that emergency communication is always available during extreme conditions.

An RF coaxial cable design to meet the above specifications has been proposed by the same Applicant in the International Application, publication number WP2019047929, the content of which is incorporated herein by reference in its entirety. In the proposed design in said International Application, insulating materials made of thermoplastic compounds filled with mineral particles (ceramic or glass) or inserted ceramic disks or beads made of ceramic material were proposed.

Some dielectrics cannot survive extreme heat conditions, for example during a fire (e.g., temperatures around 1850° F.), as they will likely start to melt at around 300° F. As already mentioned above, when the dielectric melts, it fails in its purpose to keep the inner and outer conductors separated. Consequently, the inner conductor will short-circuit with the outer conductor.

Some other dielectrics may be able to withstand the high temperature of a fire, and have sufficient strength to maintain the characteristic impedance, but are unsuitable for RF communication because they significantly attenuate signals transmitted via the coaxial cable at normal temperature (e.g. room temperature).

As mentioned above, to meet established fire codes, an RF coaxial cable needs to pass the 2-hour burn (e.g. per UL 2196) and the subsequent steps of the test. To the knowledge of the inventors, the dielectric material inside at least some of the existing RF coaxial cables will often either burn or deform so that their inner conductor will form a short-circuit with the outer conductor, as mentioned above. Further, existing RF coaxial cables that use copper conductors are prone to oxidization, thereby causing the copper to react with air to form cupric oxide which makes the conductor very brittle. As a result, the conductor tends to break easily, thus making the conductor an inoperable, electrical open circuit.

It is desired to provide an RF coaxial cable that can withstand the above-mentioned tests at high temperatures, and ensure that at such high temperatures, at least emergency communication is available. Such high temperature can range up to 1850° F.

FIG. 1 shows a schematic representation of an example RF coaxial cable 100. The cable 100 comprises a first conductor 110, provided along the central longitudinal axis of the cable 100. A second conductor 120 is provided coaxially around the first conductor 110. A dielectric material 130, is provided in a space between the first conductor 110 and the second conductor 120. In the example shown in FIG. 1, the dielectric material 130 is shown to be helically wound around the first conductor 110. This helical shape however is only exemplary and the dielectric material 130 may have other shapes as long as it serves the purpose of maintaining the first conductor 110 and the second conductor 120 separated from each other by a certain distance (i.e. gap). The coaxial cable also comprises additional layers such as protective coatings and jackets, shown generally by reference numeral 140, details of which are not considered to be of relevance for the present discussion.

Ceramic and silica dielectrics may be used in RF coaxial cables. These materials are often made from ceramic or silica fibers which are typically coated with an organic material. These dielectric materials will typically not melt at high temperatures. For this reason, these dielectric materials may be suitable for use in the structure of the RF coaxial cable as proposed by the present disclosure.

Figure 2A:
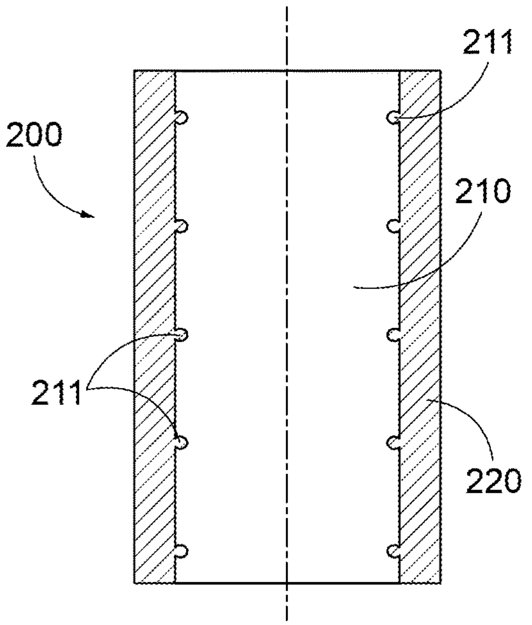
FIGS. 2A to 2D are schematic representations of an example dielectric material structure for a coaxial cable shown in a cross-sectional view along the central longitudinal axis of the structure.

FIG. 2A is a schematic representation of a cross-section of a suitable dielectric structure 200 taken along a central, longitudinal axis of the dielectric material 130 of FIG. 1. Dielectric structure 200 comprises a bulk dielectric section 210 which is covered by a coating section 220 typically made of an organic material. In some embodiments, such as the one shown in FIG. 1, the bulk section 210 has, at the outer surface thereof, small recesses 211, which are filled with the organic material as well. However, for the purpose of this disclosure, such recesses are not essential within the structure of the dielectric material. Non-limiting examples of organic materials are: starch, oil, wax or dye for coloring the ceramic fiber.

One reason to provide an organic material surrounding the dielectric material is that such organic material would consume oxygen present in its surroundings inside the RF coaxial cable. This is desirable as it helps prevent the interior surfaces of the cable from being oxidized. Another reason to include an organic material in the cable is that it may improve the mechanical performance and provide certain flexibly in the structure of the dielectric material, and consequently the coaxial cable, so that it can be bent and inserted in conduits with bends and turns and the like.

Figure 2B:
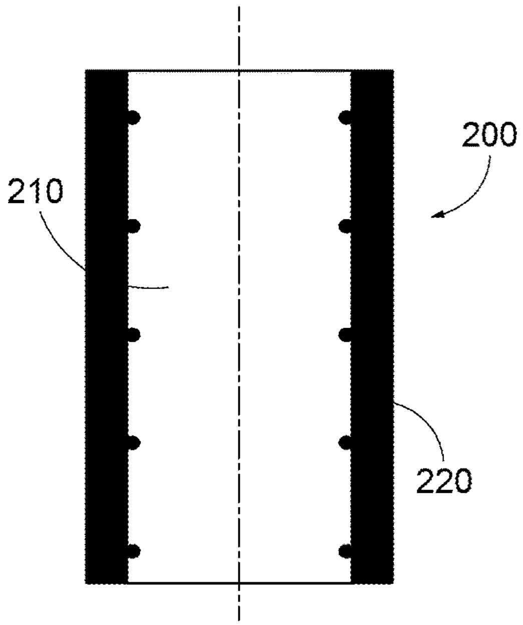

In case of a significant rise in temperature, e.g. in case of a fire and in the absence of oxygen, this organic material 220 can char, and as a result, turn into graphite. FIG. 2B schematically shows the dielectric structure 200 of FIG. 2A, with the organic layer 220 burnt and turned into graphite (shown in solid black color). Should this happen inside an RF coaxial cable, the conversion of the organic coating 220 into graphite, which is a conductor, would cause an electrical short-circuit between the two conductors, 110 and 120 in FIG. 1, of the coaxial cable 100. This short-circuit situation is undesirable as it would cause a loss in signal transmission.

Figure 2C:
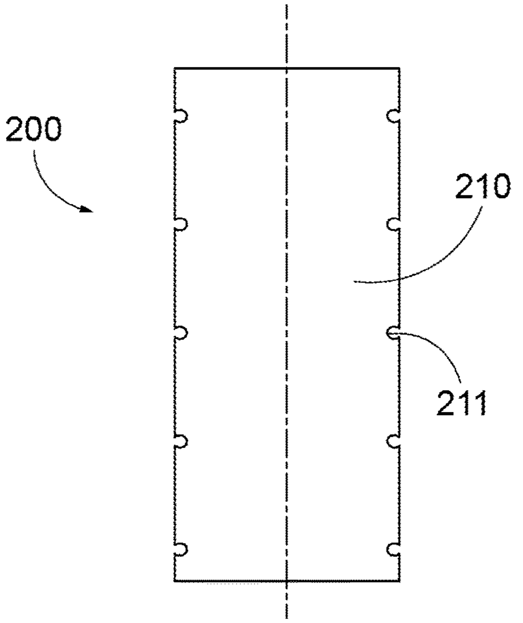

Experiments performed by the inventors has shown that in a heat cleaning process of the dielectric material 200 at temperatures between 500° C. and 700° C. (932° F. and 1292° C.) for about four to twelve hours, and in the presence of oxygen, the organic coating (220 in FIG. 2A) instead of converting into graphite, may convert entirely into CO2 or CO and thus be removed entirely from the bulk section 210 as a gas. The choice of the exact temperature within the above range would depend on the type and/or the amount of the organic material Likewise, the choice of the amount of time that the heat cleaning process is employed would depend on the amount of the organic material. The resulting bulk section would therefore have a shape which is schematically shown in FIG. 2C. It may be observed in FIG. 2C that the organic material has been removed not only from the outer surface 212 of the bulk section 210, but from the recesses 211.

For the sake of clarity, it is to be emphasized that a reference to the conversion of the "entire" organic coating into a gas is to be understood not only to cases where absolutely all the organic material has been converted into a gas, but also to cases where small amounts of the organic material may remain present on the surface of the bulk section, which are small enough such that they are incapable of providing the mechanical properties of the organic material prior to the conversion. In such a case, the small amount of the remaining organic material is to be considered as negligible. Therefore, for practical purposes, it may be considered that the entire organic material has been removed from the bulk section.

One example of a heat cleaning process may be found in "3M™ Nextel™ Ceramic Fibers and Textiles: Technical Reference Guide," the content of which is incorporated herein by reference in its entirety. The heat cleaning process as described in the referenced example is carried out at 700° C. (1292° F.) in the presence of oxygen. At this temperature, the heat cleaning process causes the organic material to burn which will then turn into carbon gases, $CO_2$ or CO.

However, in heat cleaning processes, i.e. at temperatures between 500° C. or 700° C., although the remaining bulk section 210 of the dielectric does not melt, it will turn brittle and fragile. This can also be problematic because such fragile structure may break under torsion and thus fail to maintain the required gap between the two conductors.

The term brittle, as used herein, is to be understood to refer to a status of hardness and rigidity of a material such that it will break under a relatively low tensile strength Likewise, the term flexible is to be understood to refer to a capability of a material to undergo relatively high tensile strength, e.g. be bent, without breaking. Therefore, the terms brittle and flexible are to be construed to have mutually opposite meaning with respect to each other.

However, based on further experiments of the inventors, it is observed that a heat cleaning process may be applied on the unprocessed dielectric material (e.g. as shown in FIG. 2A) at a relatively lower temperatures in which, while a substantial amount of the organic material is removed, as explained above, conversion of the entire organic coating into gases is avoided, thereby maintaining a certain amount of the organic material on the surface of the bulk section. The remaining amount of the organic material may serve the purposes expected therefrom, i.e. consuming oxygen and providing mechanical integrity and flexibility. Furthermore, a heat cleaning process at such relatively lower temperature may not result the dielectric material to become brittle and fragile to an extent that it may break in case of bends or torsions.

In this regard, the unprocessed dielectric material (as shown in FIG. 2A) may be subjected to a heat cleaning process at relatively lower temperatures, e.g. in a range between 200° C. and 300° C. (392° F. and 572° F.) under which the entire organic material will not burn, and instead, small amounts of such material will remain on the surface around the bulk dielectric fiber.

Figure 2D:
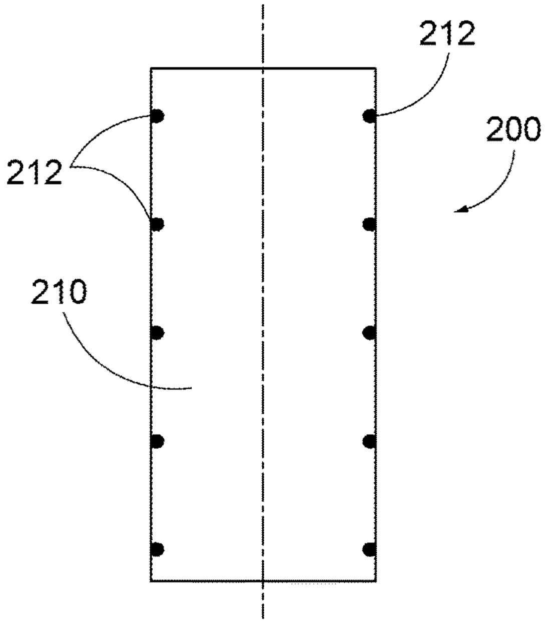

FIG. 2D is an exemplary schematic representation of the heat cleaned dielectric bulk material after having been subjected to the above relatively low temperature heat cleaning process, e.g. 200° C., in the presence of oxygen and for about one week. As seen in FIG. 2D, the entire organic material is not removed and small amounts thereof still remains on the surface of the bulk section, e.g. in the recesses 211 or elsewhere. This remaining organic material—which has not been converted into gas—is represented in FIG. 2D by reference numeral 212.

The above principles are used in providing a hybrid dielectric structure according to embodiments of the disclosure.

Figure 3:
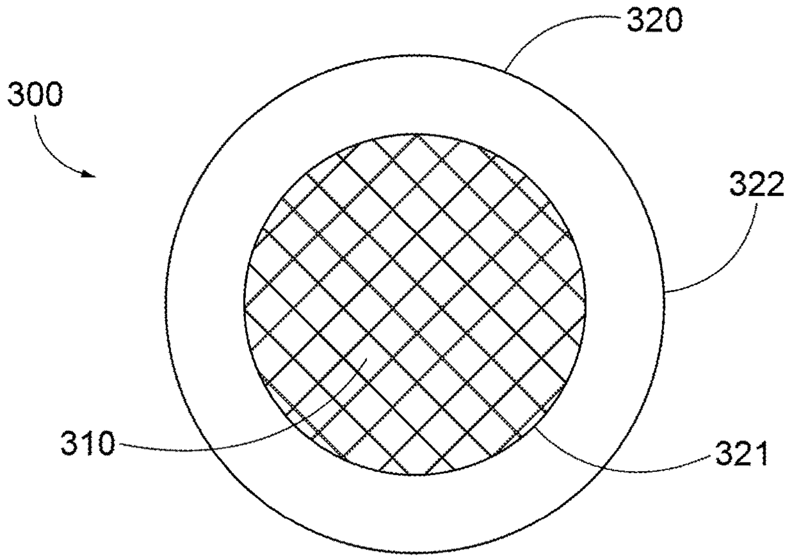
FIG. 3 is a schematic representation of an example hybrid dielectric material structure for a coaxial cable shown in a cross-sectional view along a plane perpendicular to the central longitudinal axis of the structure, according to some embodiments.

FIG. 3 shows an example of a hybrid dielectric structure 300 according to some embodiments, representing the structure in cross-sectional view, along a plane perpendicular to the central, longitudinal axis of the structure (axis not shown). The hybrid dielectric structure 300 comprises a core section 310, for example of a cylindrical shape, surrounded by an outer layer 320, thereby forming a coaxial structure. It is emphasized that, for the sake of a better understanding of the present description, the dimensions of the core section and the outer layer are not necessarily to scale.

According to some embodiments, the core section 310 may be made of silica ($SiO_2$) or ceramic fibers (e.g. $Al_2O_3$, $SiO_2$, and $B_2O_3$). Examples of these materials may be Nextel™ 440 (Nextel is a trademark of 3M Company) or Quartzel® (Quartzel is a trademark of Saint-Gobain Quartz S.A.S.).

The outer layer 320 may also be made of silica. This material may be for example Quartzel™ braiding or sewing yarns. In some embodiments the ratio by weight between the core section and the organic layer may be about 50%.

However, prior to applying the outer layer 320 to the core section 310, the core section is heat cleaned in a fashion similar to the one described with reference to FIGS. 2A and 2C.

In particular, in order to heat clean the core section 310, an unprocessed dielectric material, e.g. as shown in FIG. 2A, may be used as a starting material. The unprocessed dielectric material is then subjected to a heat cleaning process, in the presence of oxygen, at a temperature between 500° C. and 700° C., for example at 500° C. As a result of this heat cleaning process, the organic layer, 220 in FIG. 2A, turns into $CO_2$ or CO gas, thus being entirely removed from the surface of the bulk section, as shown in FIG. 2C. However, as already mentioned with reference to FIG. 2 above, due the effect of the applied temperature in the heat cleaning process, the heat cleaned core section 310 would become brittle, which may cause it to break.

To remedy this, embodiments of the disclosure propose the addition of the second layer (or outer layer) 320 to the core section 310 as discussed below. It is noted that the core section 310 in FIG. 3, after heat cleaning, is similar to the bulk section 210 in FIG. 2C. The outer layer 320 may be applied over the core section 310 by processes such as braiding which is known to those of ordinary skill the related art.

The outer layer is also a dielectric material having a bulk section 321 and an outer layer of organic material 322. Once the outer layer 320 is applied over the core section 310, a second heat cleaning process is performed, this time at a relatively lower temperature, e.g. 200° C. As a result, the organic material on the outer layer 320 will be partially removed, as discussed with reference to FIG. 2D. Therefore, a relatively small amount of the organic material will remain, which although it is also burnt, it still maintains, at least to a sufficient extent, the desired properties of an unburnt organic material. One the other hand, the heat cleaning at such lower temperature does not convert the dielectric material of the outer layer 320 into brittle thus the hybrid structure still maintains flexibility as is desired.

Figure 4:
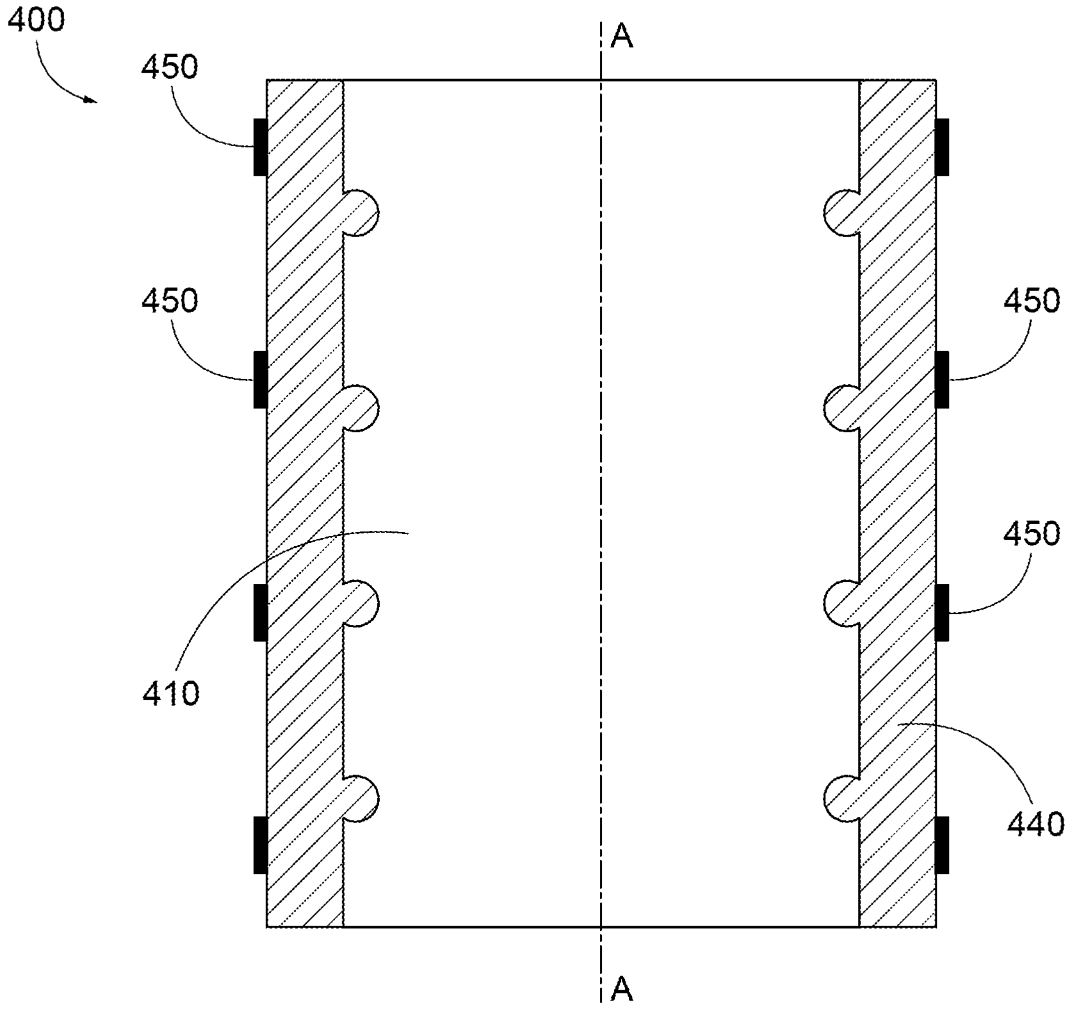
FIG. 4 is a schematic representation of an example hybrid dielectric material structure for a coaxial cable shown in a cross-sectional view along the central longitudinal axis of the structure, according to some embodiments.

FIG. 4 shows a schematic example of the resulting structure of the hybrid dielectric 400 presented in a cross-sectional view along the central, longitudinal axis A-A of the structure. As it can be observed, the hybrid dielectric structure 400 comprises a core section 410 which is entirely heat cleaned at a first temperature, e.g. 500° C.; an outer layer 440 which is heat cleaned at a second temperature lower than the first temperature, e.g. 200° C. with the burnt, but still usable, organic material 450 partially remaining on the surface of the outer layer 440, thereby providing the desired properties of an organic material surrounding the dielectric structure.

A hybrid dielectric structure as described above thus provides the desired insulation resistance and mechanical performance.

Figure 5A:
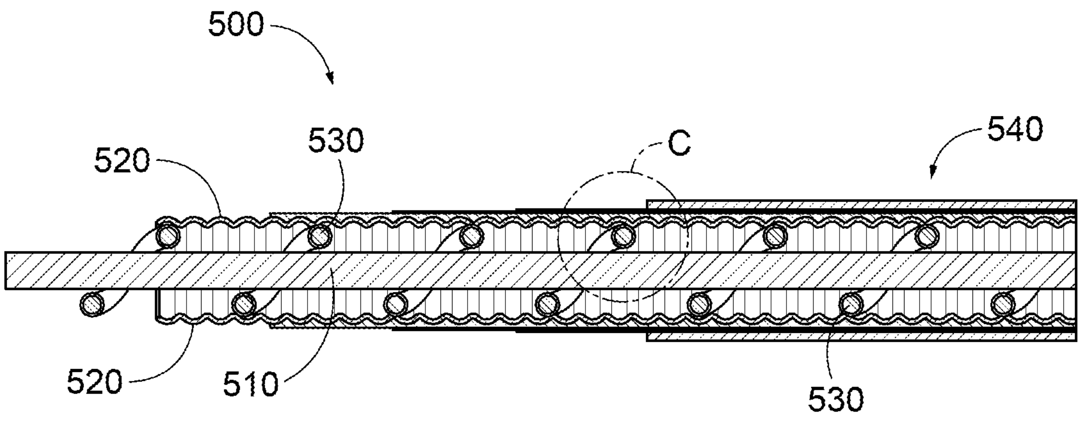
FIG. 5A is a schematic representation of an example radio frequency coaxial cable comprising a hybrid dielectric material structure, shown in a cross-sectional view along the central longitudinal axis of the cable.

Some embodiments of the disclosure feature an RF coaxial cable comprising the hybrid dielectric structure as described above. FIG. 5A is a schematic representation of a cross-section of an RF coaxial cable 500 according to some embodiments, comprising a first conductor 510, a second conductor 520 and a hybrid dielectric material 530, as described herein, provided between the first conductor 510 and the second conductor 520. The RF coaxial cable further comprises outer protective layers and jacketing collectively represented by reference numeral 540. Such RF coaxial cable 500, is thus capable of withstanding the tests mentioned above thanks to the use of the hybrid dielectric such that when an extreme temperature is present in the vicinity of the RF coaxial cable, even if the organic material is converted in a graphite, the amount of the graphite is not sufficient to produce an electrical short-circuit between the first and the second conductors 510 and 520. Furthermore, such small amount of organic material inside the cable may help consume the oxygen that may be inside the cable or leak inside the cable during a fire, which is a desirable property of the organic material.

Figure 5B:
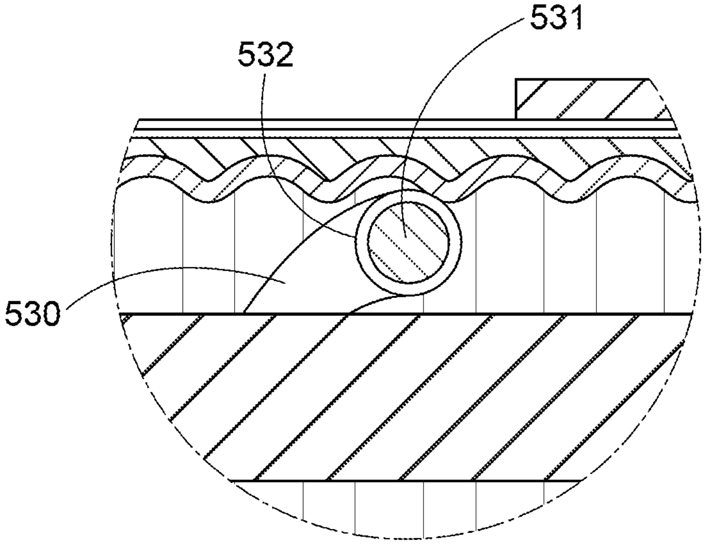
FIG. 5B is a schematic representation of a section of the RF coaxial cable of FIG. 5A shown in further detail.

FIG. 5B is an enlarged view of a cross-section of the hybrid dielectric material at location C shown in FIG. 5A. In FIG. 5B the core section 531 and the outer layer 532 can be more clearly observed.

Figure 6:
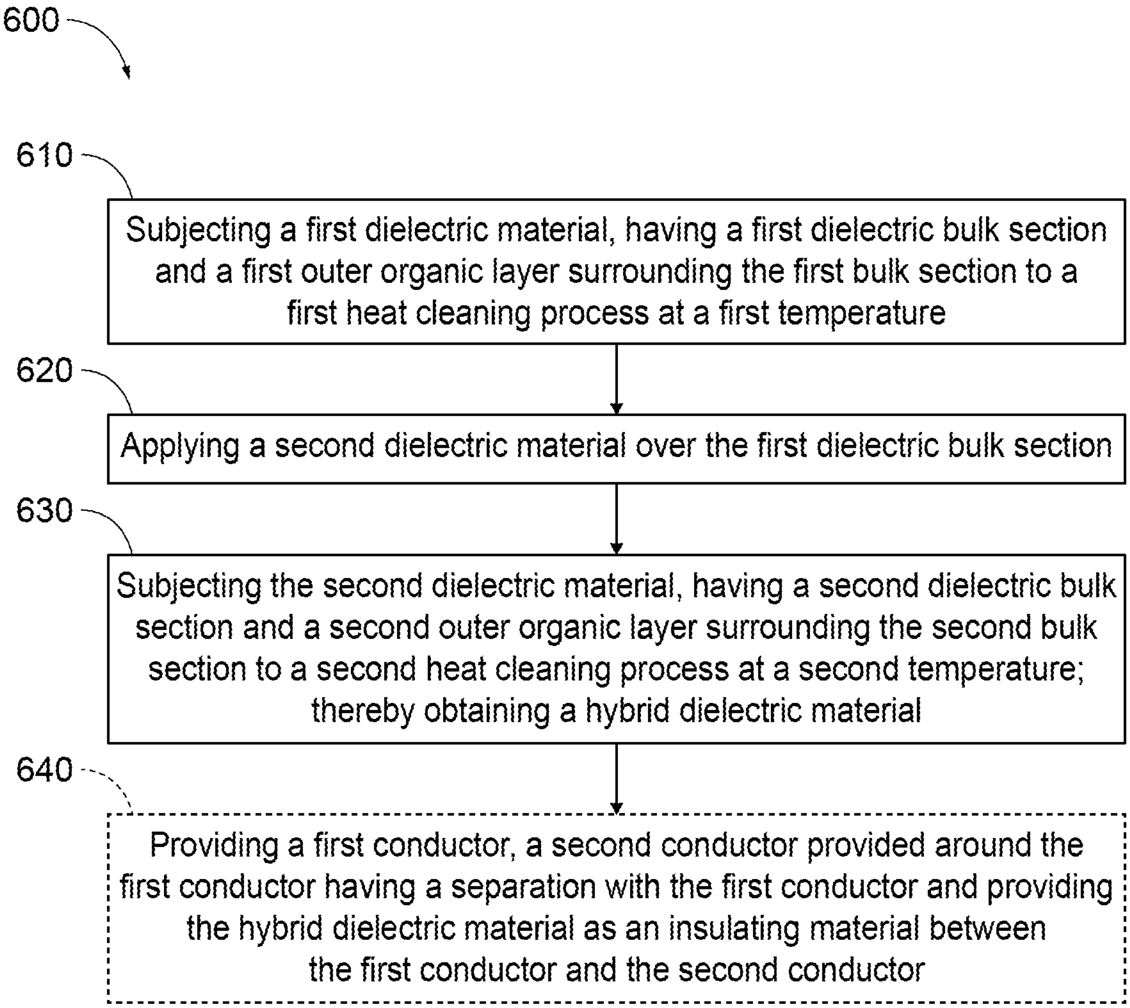
FIG. 6 represents a method of manufacturing a hybrid dielectric material and an optional step of manufacturing a coaxial cable.

FIG. 6 illustrates a method 600 of manufacturing a hybrid dielectric material. At a step 610 a first dielectric material, having a first dielectric bulk section and a first outer organic layer surrounding the first bulk section is subjected to a first heat cleaning process at a first temperature between 500° C. and 700° C., for example at 500° C. As a result of this heat cleaning process, the first organic layer (220 in FIG. 2A), turns into CO2 or CO gas, thus being entirely removed from the surface of the bulk section (as shown in FIG. 2C). However, due the effect of the applied temperature in the heat cleaning process, the heat cleaned first dielectric bulk section would become brittle, which may cause it to break.

At a step 620, a second dielectric material is applied over the first dielectric bulk section, the second dielectric material having a second dielectric bulk section and a second outer organic layer surrounding the second bulk section.

Once the second dielectric material is applied over the first dielectric bulk section, at step 630—the second dielectric material is subjected to a second heat cleaning process at a second temperature between 200° C. and 300° C. and in the presence of oxygen. As a result, the second outer organic layer will be partially removed (as discussed with reference to FIG. 2D). Therefore, a relatively small amount of the organic material will remain, which still maintains, at least to a sufficient extent, the desired properties of an unburnt organic material. On the other hand, the heat cleaning at such lower temperature does not convert the dielectric material of the outer layer into brittle thus the hybrid structure still maintains flexibility as is desired.

The method of FIG. 6 can optionally be further extended to a method of manufacturing a coaxial cable by providing, at a step 640, a first conductor, a second conductor provided around the first conductor having a separation with the first conductor and providing the hybrid dielectric material obtained at step 630 as an insulating material between the first conductor and the second conductor.

What is claimed is:

1. An article of manufacture comprising:

a first section comprising a first dielectric material having a cylindrical shape, the first section comprising a plurality of recesses respectively embedded in an outer surface of the first section, each of the plurality of recesses is exposed and spaced apart from one another in the outer surface of the first section;

a second section comprising a second dielectric material and provided on an outer surface of the first section, thereby forming a cylindrical coaxial structure together with the first section;

wherein the second dielectric material of the second section is more flexible than the first dielectric material of the first section; and wherein the second section comprises elements of an organic material located in the plurality of recesses, wherein the elements of the organic material are spaced apart from one another in the plurality of recesses, thereby preventing a short circuit in the event the organic material is charred.

2. The article of manufacture of claim 1, wherein the first dielectric material of the first section is brittle and the second dielectric material of the second section is flexible.

3. The article of manufacture of claim 1, wherein the first dielectric material is one of ceramic or silica.

4. The article of manufacture of claim 1, wherein the second dielectric material is silica.

5. A radio frequency coaxial cable, comprising:

a first conductor;

a second conductor provided around the first conductor having a separation therewith;

an insulating material provided within the separation between the first conductor and the second conductor; the insulating material including:

a first section comprising a first dielectric material having a cylindrical shape, the first section comprising a plurality of recesses respectively embedded in an outer surface of the first section, each of the plurality of recesses is exposed and spaced apart from one another in the outer surface of the first section;

a second section comprising a second dielectric material and provided on an outer surface of the first section, thereby forming a cylindrical coaxial structure together with the first section;

wherein the second dielectric material of the second section is more flexible than the first dielectric material of the first section; and wherein the second section comprises elements of an organic material located in the plurality of recesses, wherein the elements of the organic material are spaced apart from one another in the plurality of recesses, thereby preventing a short circuit between the first and second conductors in the event the organic material is charred.

6. The radio frequency coaxial cable of claim 5, wherein the insulating material is disposed helically around the first conductor.

7. The radio frequency coaxial cable of claim 5 wherein the first dielectric material is one of ceramic or silica.

8. The radio frequency coaxial cable of claim 5 wherein the second dielectric material is silica.

9. A radio frequency coaxial cable, comprising:

a first conductor;

a second conductor provided around the first conductor having a separation therewith;

an insulating material provided within the separation between the first conductor and the second conductor; the insulating material including:

a first section comprising a first dielectric material having a cylindrical shape, the first section comprising a plurality of recesses respectively embedded in an outer surface of the first section, each of the plurality of recesses is exposed and spaced apart from one another in the outer surface of the first section;

a second section comprising a second dielectric material and provided on an outer surface of the first section, thereby forming a cylindrical coaxial structure together with the first section;

wherein the second dielectric material of the second section is more flexible than the first dielectric material of the first section;

wherein the second section comprises elements of an organic material located in the plurality of recesses; and wherein the first dielectric material of the first section is brittle and the second dielectric material of the second section is flexible, wherein the elements of the organic material are spaced apart from one another in the plurality of recesses, thereby preventing a short circuit between the first and second conductors in the event the organic material is charred.

10. An article of manufacture comprising:

a first section comprising a first dielectric material having a cylindrical shape, the first section comprising a plurality of recesses respectively embedded in an outer surface of the first section, each of the plurality of recesses is exposed and spaced apart from one another in the outer surface of the first section;

a second section comprising a second dielectric material and provided on an outer surface of the first section, thereby forming a cylindrical coaxial structure together with the first section;

wherein the second dielectric material of the second section is more flexible than the first dielectric material of the first section; and wherein the second section comprises elements of an organic material located in the plurality of recesses; and wherein the elements of the organic material are spaced-apart burnt remainder elements of an organic material in the plurality of recesses embedded in the outer surface of the second section.

11. A radio frequency coaxial cable, comprising:

a first conductor;

a second conductor provided around the first conductor having a separation therewith;

an insulating material provided within the separation between the first conductor and the second conductor; the insulating material including:

a first section comprising a first dielectric material having a cylindrical shape, the first section comprising a plurality of recesses respectively embedded in an outer surface of the first section, each of the plurality of recesses is exposed and spaced apart from one another in the outer surface of the first section;

a second section comprising a second dielectric material and provided on an outer surface of the first section, thereby forming a cylindrical coaxial structure together with the first section;

wherein the second dielectric material of the second section is more flexible than the first dielectric material of the first section;

wherein the second section comprises elements of an organic material located in the plurality of recesses; and wherein the elements of the organic material are burnt remainder elements of an organic material in the plurality of recesses embedded in the outer surface of the second section, wherein the elements of the organic material are spaced apart from one another in the plurality of recesses, thereby preventing a short circuit between the first and second conductors in the event the organic material is charred.

12. A radio frequency coaxial cable, comprising:

a first conductor;

a second conductor provided around the first conductor having a separation therewith;

an insulating material provided within the separation between the first conductor and the second conductor; the insulating material including:

a first section comprising a first dielectric material having a cylindrical shape, the first section comprising a plurality of recesses respectively embedded in an outer surface of the first section, each of the plurality of recesses is exposed and spaced apart from one another in the outer surface of the first section;

a second section comprising a second dielectric material such that the entire inner surface of the second section is provided on the entire outer surface of the first section, thereby forming a cylindrical coaxial structure together with the first section;

wherein the second dielectric material of the second section is more flexible than the first dielectric material of the first section; and wherein the second section comprises elements of an organic material located in the plurality of recesses, wherein the elements of the organic material are spaced apart from one another in the plurality of recesses, thereby preventing a short circuit between the first and second conductors in the event the organic material is charred.

* * * * *